(12) United States Patent
Khazanovich

(10) Patent No.: US 11,221,666 B2
(45) Date of Patent: Jan. 11, 2022

(54) EXTERNALLY POWERED COLD KEY LOAD

(71) Applicant: BAE SYSTEMS Information and Electronic Systems Integration Inc., Nashua, NH (US)

(72) Inventor: Roman Khazanovich, Centereach, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 96 days.

(21) Appl. No.: 16/720,130

(22) Filed: Dec. 19, 2019

(65) Prior Publication Data
US 2021/0191503 A1 Jun. 24, 2021

(51) Int. Cl.
G06F 1/32 (2019.01)
G06F 1/3296 (2019.01)
G06F 13/40 (2006.01)
G06F 21/60 (2013.01)
G06F 1/3203 (2019.01)

(52) U.S. Cl.
CPC ........ *G06F 1/3296* (2013.01); *G06F 13/4068* (2013.01); *G06F 21/602* (2013.01); *G06F 1/3203* (2013.01)

(58) Field of Classification Search
CPC ... G06F 1/3296; G06F 13/4068; G06F 21/602
USPC ........................................................ 713/320
See application file for complete search history.

(56) References Cited

U.S. PATENT DOCUMENTS

| 5,010,331 | A  | * | 4/1991  | Dias     | G04F 1/005    |
|           |    |   |         |          | 340/5.28      |
| 5,131,040 | A  | * | 7/1992  | Knapczyk | H04L 9/0894   |
|           |    |   |         |          | 380/277       |
| 5,457,748 | A  | * | 10/1995 | Bergum   | G06F 21/86    |
|           |    |   |         |          | 380/270       |
| 6,366,117 | B1 | * | 4/2002  | Pang     | G06F 21/76    |
|           |    |   |         |          | 326/38        |
| 6,839,433 | B1 | * | 1/2005  | Quan     | H04N 7/1693   |
|           |    |   |         |          | 348/470       |
| 8,522,052 | B1 | * | 8/2013  | Lesea    | H03K 19/1733  |
|           |    |   |         |          | 713/194       |
| 8,720,238 | B1 | * | 5/2014  | Davis    | E05B 17/048   |
|           |    |   |         |          | 70/278.7      |
| 8,996,869 | B1 | * | 3/2015  | Canter   | H04L 63/0428  |
|           |    |   |         |          | 713/168       |
| 2007/0168676 | A1 | * | 7/2007 | Fayad   | G06F 21/79    |
|           |    |   |         |          | 713/185       |
| 2009/0060194 | A1 | * | 3/2009 | Mackey  | G06F 21/86    |
|           |    |   |         |          | 380/277       |

(Continued)

OTHER PUBLICATIONS

International Search Report, PCT/US20/065543, 11 pages, dated Mar. 23, 2021.

*Primary Examiner* — Volvick Derose
(74) *Attorney, Agent, or Firm* — KPIP Law, PLLC; Gary McFaline

(57) ABSTRACT

The system and method of externally powered cold key load injects a voltage into a cryptographic computer without disturbing any data pins. There are several mechanical approaches that are viable, a Y cable implementation, a two cable solution, a direct connect solution, and more. The system includes the ability to provide a variable voltage power source to the cryptographic computer.

19 Claims, 8 Drawing Sheets

(56) References Cited

U.S. PATENT DOCUMENTS

| | | | |
|---|---|---|---|
| 2009/0256676 A1* | 10/2009 | Piccirillo | G07C 9/00309 340/5.65 |
| 2010/0169671 A1* | 7/2010 | Coussieu | G06F 21/75 713/193 |
| 2011/0093840 A1* | 4/2011 | Pynenburg | H02J 7/00047 717/168 |
| 2011/0208966 A1* | 8/2011 | Silverbrook | G06F 21/31 713/168 |
| 2012/0210138 A1* | 8/2012 | Tucker | G06F 21/755 713/189 |
| 2014/0009118 A1* | 1/2014 | Rose | H01M 50/20 320/127 |
| 2015/0156020 A1* | 6/2015 | Fogelson | G09C 1/00 380/44 |
| 2015/0302188 A1* | 10/2015 | Potbhare | G06F 21/35 713/185 |
| 2016/0097857 A1* | 4/2016 | Gokay | F41G 3/145 356/5.01 |
| 2016/0141951 A1* | 5/2016 | Mao | H02M 1/4225 363/21.02 |
| 2016/0232109 A1* | 8/2016 | Canter | G06F 3/0623 |
| 2016/0232729 A1* | 8/2016 | Engel-Dahan | G07C 9/00912 |
| 2017/0041137 A1* | 2/2017 | Anthony | H04L 9/0827 |
| 2017/0110898 A1* | 4/2017 | Kyriakoulis | H02J 7/0048 |
| 2017/0179761 A1* | 6/2017 | Sakuragi | G01R 27/26 |
| 2020/0134212 A1* | 4/2020 | Hutchison | H04L 9/085 |

* cited by examiner

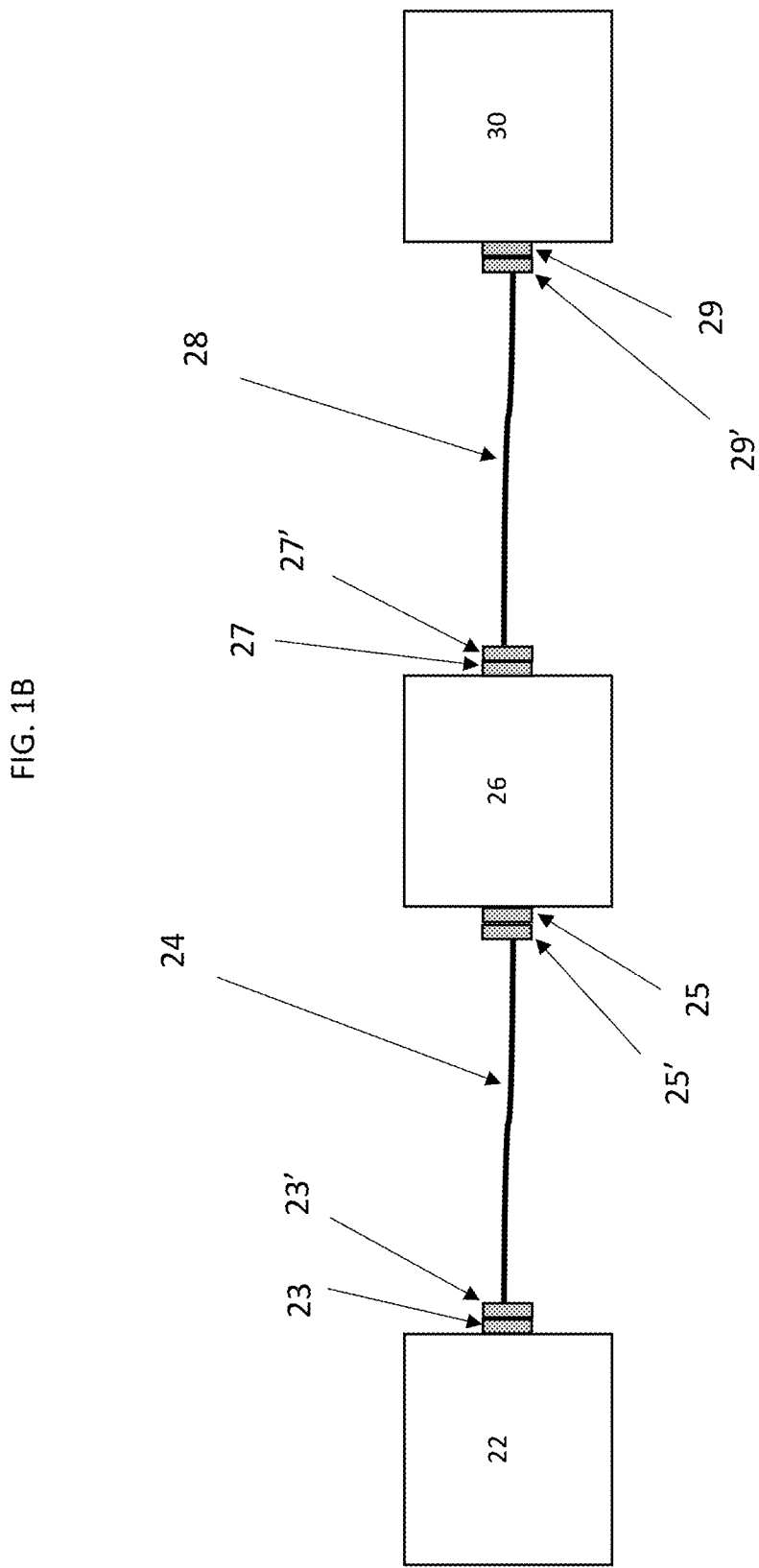

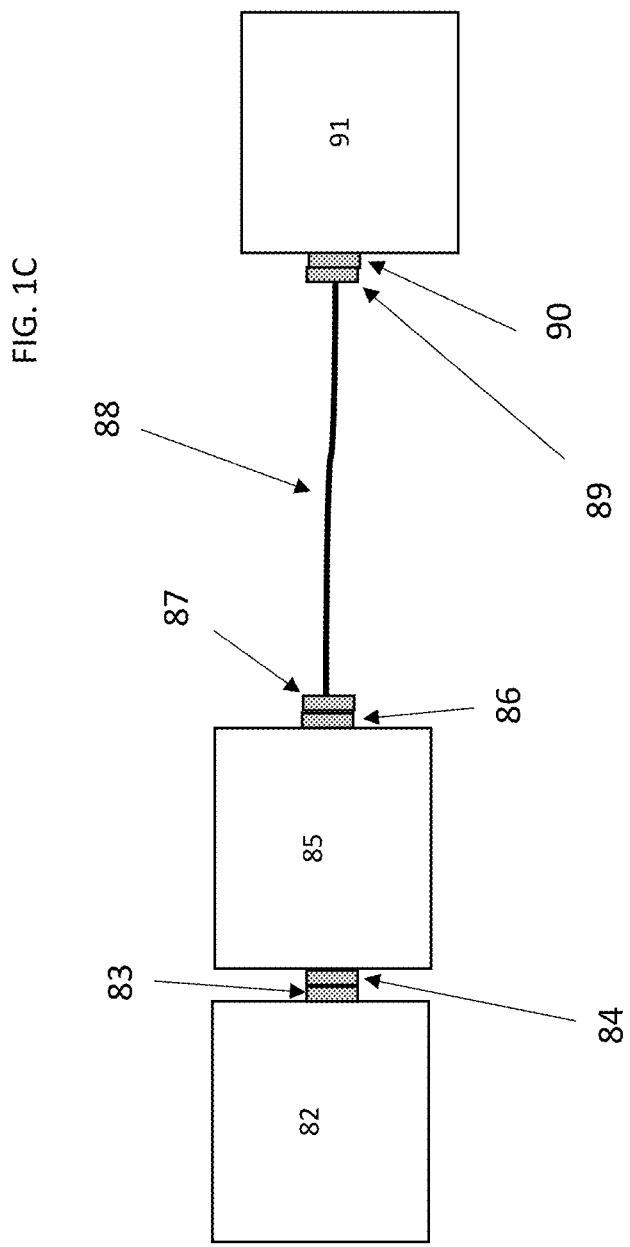

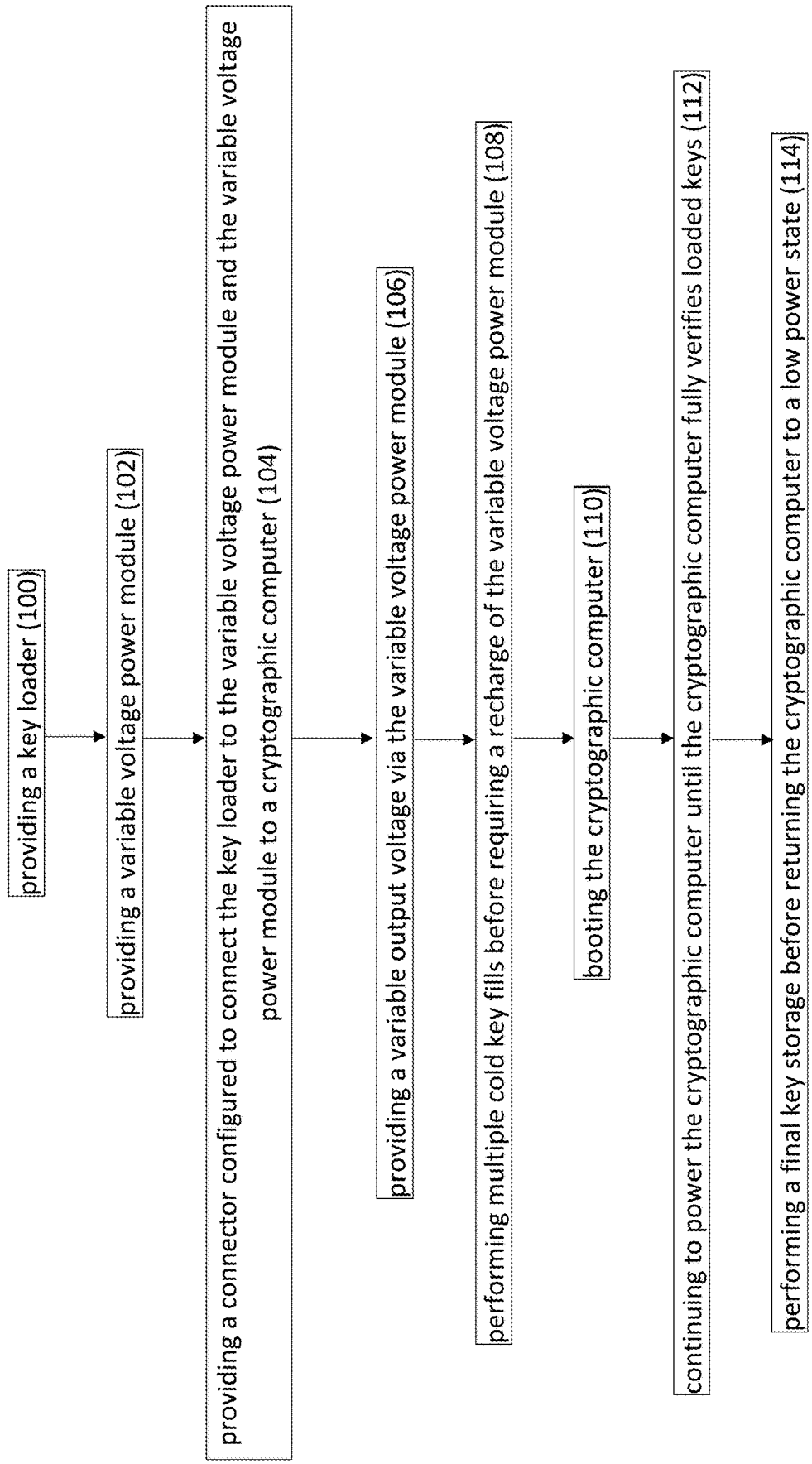

EXTERNALLY POWERED COLD KEY LOAD

STATEMENT OF GOVERNMENT INTEREST

This disclosure was made with United States Government support under Contract No. W58RGZ-13-D-0048 awarded by The United States Army. The United States Government has certain rights in this invention.

FIELD OF THE DISCLOSURE

The present disclosure relates to cold key loading and more particularly to using an external power source to cold key load a cryptographic computer.

BACKGROUND OF THE DISCLOSURE

In recent years, there has been a shift in cryptographic computer (crypto) technology from an older integrated circuit technology such as node based application-specific integrated circuit ASIC to a more modern integrated circuit technology such as System on a Chip (SoC) or Field Programmable Gate Array (FPGA) based implementation. A SoC or FPGA in one example integrates a hard processor core and programmable logic in the same device. If the crypto does not require a dedicated hard processor, an FPGA with an instantiated soft processor can also be used. The SoC or FPGA crypto engine is then surrounded by ultra-low power support components. These ultra-low power Integrated Circuits (ICs) perform security functions, key storage functions, real time clock functions, etc. The ultra-low power nature of the circuitry makes it possible for a small coin cell battery to maintain keys and provide the necessary crypto security for up to a decade. Because the coin cell battery does not require sustentation, it also alleviates battery maintenance challenges faced by the end user.

However, removing a high capacity battery and replacing it with a coin cell creates considerable problems for some missions. While the change results in a substantial savings of weight and space, which is well aligned with the military's high priority push to reduce Size, Weight, and Power (SWaP), a small coin cell cannot support a cold key fill requirement. A cold key fill is typically when a high capacity Li-ion battery enables the crypto to accept keys with the prime power removed. Wherefore it is an object of the present disclosure to overcome the above-mentioned shortcomings and drawbacks associated with the conventional cold key load methods for cryptographic computers.

SUMMARY OF THE DISCLOSURE

One aspect of the present disclosure is an externally powered cold key load system, comprising: a key loader; a variable voltage power module configured to provide a variable output voltage which is sufficient to perform multiple cold key fills before requiring a recharge of the variable voltage power module, this includes any power required to boot a cryptographic computer, perform a key fill, continue to power the cryptographic computer until the cryptographic computer fully verifies loaded keys, and subsequently perform a final key storage before returning the cryptographic computer to a low power state, wherein a low power state is a cryptographic computer state whereby a main cryptographic computer processor is turned off and only security monitoring circuitry is actively powered by a small coin-cell battery; and a connector configured to connect the key loader to the variable voltage power module and the variable voltage power module to the cryptographic computer.

One embodiment of the externally powered cold key load system is wherein the variable voltage power module comprises a rechargeable battery pack capable of supplying 18 Vdc at 30 A and has an energy storage capacity of about 6 Ampere Hours.

Another embodiment of the externally powered cold key load system is wherein the rechargeable battery pack weighs less than 2 lbs and the expected charge time of the battery pack is approximately 1 hour for a quick charge cycle or 3 hours for a standard charge cycle. In some cases, the number of cold key fills is about 90.

Yet another embodiment of the externally powered cold key load system is wherein the connector uses a DS-101 protocol. In some embodiments, five of the pins have a defined purpose and the sixth pin is used for powering the cryptographic computer without disturbing any of the data pins.

Still yet another embodiment of the externally powered cold key load system is wherein the connector is a Y cable implementation. In some cases, the connector is a two cable solution. In certain cases, the connector is a direct connect solution between the key loader and the power module.

In certain cases, the variable voltage power module is designed to run the key loader and not to power the cryptographic computer multiple times. In some embodiments, the variable voltage power module provides between 5 Vdc and 18 Vdc of power.

Another aspect of the present disclosure is a method for performing a cold key load, comprising: providing a key loader; providing a variable voltage power module; providing a connector, wherein the connector is configured to connect the key loader to the variable voltage power module and the variable voltage power module to a cryptographic computer; providing a variable output voltage via the variable voltage power module, performing multiple cold key fills before requiring a recharge of the variable voltage power module; booting the cryptographic computer; continuing to power the cryptographic computer until the cryptographic computer fully verifies loaded keys, and subsequently performing a final key storage before returning the cryptographic computer to a low power state, wherein a low power state is a cryptographic computer state whereby a main cryptographic computer processor is turned off and only security monitoring circuitry is actively powered by a small coin-cell battery.

One embodiment of the method for performing a cold key load is wherein the connector uses a DS-101 protocol. In certain embodiments, five of the pins have a defined purpose and the sixth pin is used for powering the cryptographic computer without disturbing any of the data pins.

Another embodiment of the method for performing a cold key load is wherein the connector is a Y cable implementation. In some cases, the connector is a two cable solution. In some cases, the connector is a direct connect solution between the key loader and the power module.

Yet another embodiment of the method for performing a cold key load is wherein the variable voltage power module is designed to run the key loader and not to power the cryptographic computer multiple times. In some cases, the variable voltage power module provides between 5 Vdc and 18 Vdc of power.

Yet another aspect of the present disclosure is an externally powered cold key load system, comprising: a key loader; a variable voltage power module configured to provide a variable output voltage between 5 Vdc and 18 Vdc of power which is sufficient to perform multiple cold key fills before requiring a recharge of the variable voltage power module, this includes any power required to boot a cryptographic computer, perform a key fill, continue to power the cryptographic computer until the cryptographic computer fully verifies loaded keys, and subsequently perform a final key storage before returning the cryptographic computer to a low power state, wherein a low power state is a cryptographic computer state whereby a main cryptographic computer processor is turned off and only security monitoring circuitry is actively powered by a small coin-cell battery; and a connector using a DS-101 protocol and being configured to connect the key loader to the variable voltage power module and the variable voltage power module to the cryptographic computer.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 1B is a diagrammatic view of another embodiment of a cold key load system according to the principle of the present disclosure.

FIG. 1C is a diagrammatic view of yet another embodiment of a cold key load system according to the principle of the present disclosure.

FIG. 4 is a flowchart of one embodiment of a method of performing a cold key fill according to the principles of the present disclosure.

DETAILED DESCRIPTION OF THE DISCLOSURE

Figure 1A:
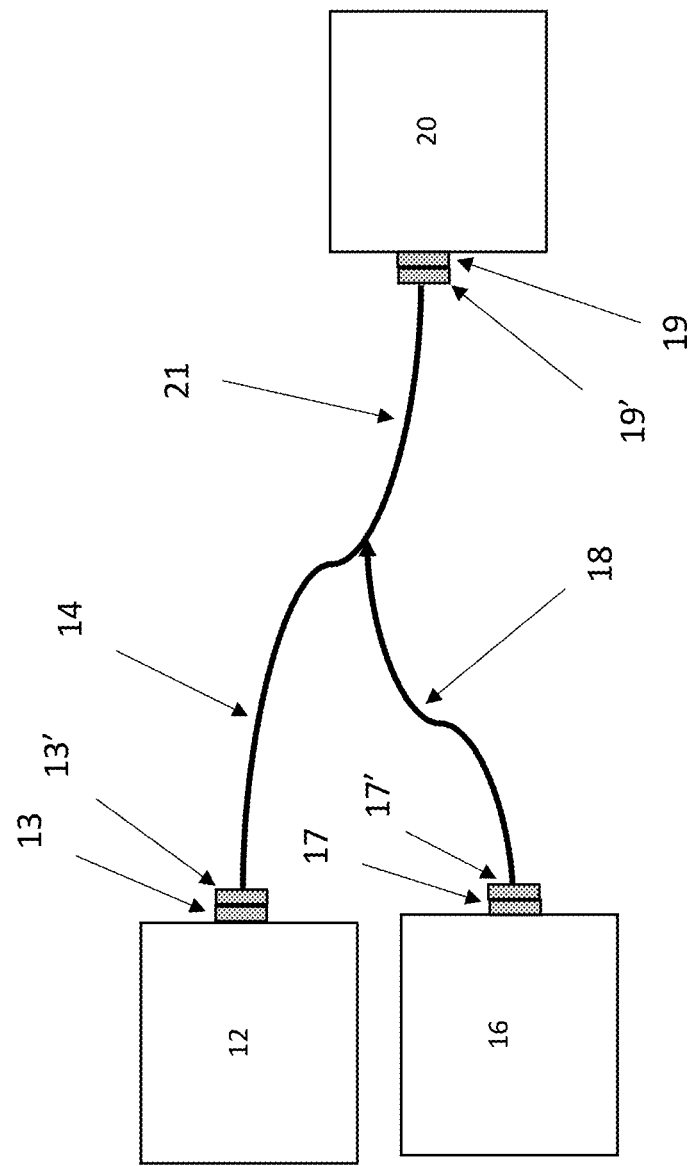
FIG. 1A is a diagrammatic view of one embodiment of a cold key load system according to the principle of the present disclosure.

Cryptography is a method of protecting information and communications through the use of codes so that only those for whom the information is intended can read and process it. In computer science, cryptography refers to secure information and communication techniques derived from mathematical concepts and a set of rule-based calculations called algorithms to transform messages in ways that are hard to decipher. These deterministic algorithms are used for cryptographic key generation and digital signing and verification to protect data privacy, web browsing on the internet, and confidential communications such as credit card transactions and email. In one example, an end user may be the military, which uses cryptography to protect data that are vital to national security.

In recent years, there has been a shift in cryptographic computer (crypto) technology from an old technology node ASIC to a more modern System on a Chip (SoC) or Field Programmable Gate Array (FPGA) based implementation. A SoC FPGA integrates a hard processor core and programmable logic in the same device. If the crypto does not require a dedicated hard processor, an FPGA with an instantiated soft processor can also be used. The SoC or FPGA crypto engine is then surrounded by ultra-low power support components. These ultra-low power Integrated Circuits (ICs) perform security functions, key storage functions, real time clock functions, etc. The ultra-low power nature of the circuitry makes it possible for a small coin cell battery to maintain keys and provide the necessary crypto security for up to a decade. Because the coin cell battery does not require sustentation, it also alleviates battery maintenance challenges faced by the end user.

However, removing a high capacity battery and replacing it with a coin cell creates considerable problems for some missions. While the change results in a substantial savings of weight and space, which is well aligned with the military's high priority push to reduce Size, Weight, and Power (SWaP), a small coin cell cannot support a cold key fill requirement. A cold key fill is typically when a high capacity Li-ion battery enables the crypto to accept keys with the prime power removed. Wherefore it is an object of the present disclosure to overcome the above-mentioned shortcomings and drawbacks associated with the conventional cold key load methods for cryptographic computers.

In order to support the two seemingly mutually exclusive high priority goals of (1) reducing SWaP and (2) maintaining cold key fill capability, a solution is proposed herein to apply external power to the crypto during the cold key fill operation. The system of the present disclosure also alleviates lower priority goals, like shifting the battery maintenance from having to take place on the equipment that is installed in military platforms, for example, to equipment that is hand-held. There is a huge difference in the environmental stress on the battery, since the hand-held device is used in environments that a person can operate in versus being installed on an aircraft where it is subjected to extreme temperatures, vibrations, etc. Oftentimes, a rechargeable Li-ion battery cannot handle the environmental requirements of a platform, so a non-rechargeable battery is used. This battery is then discarded when it is periodically replaced by a new one. This creates a lot of waste, both material waste in the form of discarded Li-ion batteries as well as a financial waste of having to constantly purchase new batteries.

In one embodiment of the externally powered cold key load of the present disclosure, an existing key fill connector is used to add in a voltage in order to power the crypto during a cold key load. One embodiment of an existing connector has six pins and uses a DS-101 protocol. Five of the pins have a defined purpose. One pin is a ground (GND), and there are pins for clear to send data (CTS), request to send data (RTS) and data transfer (RX and TX). The sixth pin is unused and thus may be used for powering the crypto according to the principles of the present disclosure.

In one embodiment, power to the unused pin is provided by power module powered by an external rechargeable Li-ion battery. In one embodiment, the power module is configured to provide voltage regulation to provide a variable output. In some cases, it has a control screen and the like. Certain embodiments of the power module of the present disclosure inject a voltage into the newly assigned pin without disturbing any of the data pins. There are several mechanical approaches that are viable. For example, FIG. 1A shows a Y cable implementation, FIG. 1B shows a two cable solution, and FIG. 1C shows a direct connect solution. Certain embodiments of the present disclosure include the ability to provide a variable voltage power source to the crypto, which commercial standards generally do not allow.

There is an existing power delivery specification that utilizes USB cables to deliver power to an end device, but the present disclosure is a different application with different requirements. For example, USB 1.x, USB 2.x, and USB 3.x provides 5 Vdc, which may be too low a voltage for a crypto. As per IEEE 802.3af, IEEE 802.3 at and IEEE 802.3bt, Power over Ethernet (PoE) voltage is usually higher than 44 Vdc at the power sourcing equipment (PSE) and higher than 37 Vdc at the powered device (PD). The power sourced by the PSE can be as high as 100 W, with power available at the PD specified to be as high as 71 W. The voltage ranges specified by the above referenced PoE specs will likely be too high for a crypto module that is designed for mobile military applications, or the like, which typically run at 28 Vdc for aircraft and 24 Vdc for vehicles. Electronic modules that are designed to run on these platforms typically operate at voltages lower than what is provided by the platform, but high enough for the module to perform voltage regulation down to the desired operating voltage level.

Certain embodiments of the present disclosure allow a versatile solution that is user controllable to provide the exact voltage required by a crypto. The present disclosure is also capable of supplying 30 A at 18 V, a current and power that is much higher than what is called out in commercial protocols. This high current may be required in certain crypto implementations. Furthermore, the key loader power source (e.g., battery) of the present disclosure is designed to run the key loader and not necessarily to provide power to the crypto multiple times.

Crypto solutions that are currently available utilize high capacity non-rechargeable Li-ion batteries that add both size and weight to the product and as such ultimately add size and weight to the platform. The high capacity Li-ion batteries also need periodic maintenance. For example, an old battery pack needs to be swapped out for a fresh one. During this procedure, the user often experiences undesirable system failures that result in a need to undergo additional system maintenance.

In certain embodiments, a platform includes helicopters, planes, and the like. However, the trend for the military is to develop and use significantly smaller platforms such as Group 1 and Group 2 Unmanned Aerial Vehicles (UAVs), which range in weight from 0 to 55 lbs. One consideration is that small sized vehicles can more easily be transported and managed in the field. Another is performance, as many applications (e.g., surveillance) require no payload beyond onboard sensors. Thus, smaller vehicles are cheaper, require less fuel, etc. In the case of reconnaissance and surveillance, the smaller the vehicle, the less likely it will be detected. In some cases, small UAVs have evolved into formal weapons systems that are deployed in combat zones. As competition increases to make ever smaller vehicles, the SWaP requirements of sensors and perception systems become paramount.

Power sources of the present disclosure are better than existing solutions since they alleviate a high priority problem associated with existing battery maintenance while also enabling a reduction in SWaP. This solution would also not add an additional burden to system logistics. An argument can be made that this solution may even simplify the logistics since it will decrease the number of batteries needed to be purchased and maintained by a particular system. Lastly, this solution will eliminate a lot of waste since this solution proposes the use of a rechargeable battery while many current crypto batteries are not rechargeable and are thus discarded at the end of their useful life.

Referring to FIG. 1A, a diagrammatic view of one embodiment of a cold key load system according to the principle of the present disclosure is shown. More specifically, in this embodiment a single cable with three connectors is used. In one embodiment the power module of the present disclosure 16 acts in parallel with key fill device 12 and the crypto 20. The power module of the present disclosure 16 does not touch any of the communication signals. The leg of the cable 18 going to 16 contains only the voltage and ground signals, while the leg of the cable 14 going to the key fill device 12 contains the communication signals necessary to transfer keys. The power module of the present disclosure 16 injects a voltage to power the crypto 20 for key fill when primary power is removed from the crypto.

In certain embodiments, this auxiliary cold key fill voltage provides enough power to the crypto for it to be fully operational for the duration of the key fill. This includes providing enough power to give the crypto the ability to fully verify keys and subsequently perform a final storage before returning to a low power state. The voltage supplied by the power module of the present disclosure 16 is combined in a Y cable configuration and appears on the same connector 19 as the communication signals originating from the key fill device 12. One advantage of this approach is having to maintain only one cable (shown in three parts 14, 18, 21) instead, for example, the two cables required for the implementation shown in FIG. 1B.

Still referring to FIG. 1A, 12 is a key fill device such as the Simple Key Loader (SKL); 13 is a key fill device connector mated to 13', where 13' is a key fill Y cable connector mated to 13; 14 is one leg of the Y cable from the key fill device to the crypto; 16 is a power module according to the principles of the present disclosure, which is described in detail herein; 17 is a power module device connector mated to 17', where 17' is a key fill Y cable connector mated to 17; 18 is one leg of the Y cable from the power module 16 to the crypto; 19 is a crypto connector mated to 19', where 19' is a key fill Y cable connector mated to 19; 20 is a cryptographic computer; and 21 is one leg of the Y cable containing combined signals from the power module 16 and the key fill device 12 going to the cryptographic computer (crypto) 20. In certain embodiments, 13, 17, and 19 are U-328/U 6—Pin Audio Male Connectors and 13', 17', and 19' are U-329/U—6 Pin Audio Female Connectors. In other embodiments, key loaders 13, 13', 17, 17', 19, and 19' are USB or other connectors. In some cases, the cable and the connector assembly are subject to government certification and as such the system of the present disclosure can use any such connector approved by the government for key fill use.

Referring to FIG. 1B, a diagrammatic view of another embodiment of a cold key load system according to the principle of the present disclosure is shown. More specifically, in one embodiment an intermediate power module 26 according to the principles of the present disclosure is introduced to inject a voltage onto a pin of a connector and that voltage is used to power up a crypto 30 to perform cold key fill operation. In one embodiment, a key loader's 22 signals are isolated and passed through 24. One embodiment of the existing connector has six pins and uses a DS-101 protocol. Five of the pins have a defined purpose. One pin is a ground (GND); and there are pins for clear to send data (CTS), request to send data (RTS) and data transfer (RX and TX). The sixth pin is unused and thus may be used for powering the crypto according to the principles of the present disclosure.

Still referring to FIG. 1B, in one embodiment, only the key loader GND pin is used and this is transparent to the key loader 22. The key loader 22 continues to communicate with the crypto 30 via DS-101 protocol (24, 28), or the like. There, the added voltage (+Vdc) is added via a rechargeable battery via the power module 26 and all of the signals from the key loader to the crypto are untouched. In this embodiment, power module 26 is a pass-through for the communication signals that injects a voltage to power the crypto 30 for key fill when primary power is removed from the crypto. This auxiliary cold key fill voltage provides enough power to the crypto for it to be fully operational for the duration of the key fill. This includes providing enough power to give the crypto the ability to fully verify keys and subsequently perform a final storage before returning to a low power state. One advantage of this approach is that appropriately designing the length of the cable 24 between the key fill device 22 and the power module of the present disclosure 26 may make the entire assembly easier to physically handle.

Further referring to FIG. 1B, 22 is a key fill device such as the Simple Key Loader (SKL) and 23 is a key fill device connector mated to 23; 23' is a key fill cable connector mated to 23; 24 is a cable from the key fill device to the power module 26 according to the principles of the present disclosure; 25 is a power module 26 connector mated to 25', where 25' is a key fill cable connector mated to 25; 26 is a power module according to the principles of the present disclosure, which is described in detail herein; 27 is a power module 26 connector mated to 27', where 27' is a key fill cable connector mated to 27; 28 is a cable from the power module 26 to the crypto 30; 29 is a crypto connector mated to 29', where 29' is a key fill cable connector mated to 28; and 30 is a cryptographic computer. In one embodiment of the present disclosure, 23, 25, 27, and 29 are U-328/U 6—Pin Audio Male Connectors and 23', 25', 27' and 29' are U-329/U—6 Pin Audio Female Connectors. In another embodiment, 23, 23', 25, 25', 27, 27', 29, and 29' are USB or other connectors. The cable and the connector assembly are subject to government certification and the system of the present disclosure can use any connector approved by the government for key fill use.

Referring to FIG. 1C, a diagrammatic view of yet another embodiment of a cold key load system according to the principle of the present disclosure is shown. More specifically, in this embodiment a single cable with three connectors is used. In this embodiment, the power module 85 is inserted between the key fill device 82 and the crypto 91. The power module 85 is directly connected to the key fill device 83 without using any cable. The power module 85 is a pass-through for the communication signals. The power module 85 injects a voltage to power the crypto 91 for key fill when primary power is removed from the crypto. This auxiliary cold key fill voltage provides enough power to the crypto for it to be fully operational for the duration of the key fill. This includes providing enough power to give the crypto the ability to fully verify the keys and subsequently perform a final storage before returning to a low power state. One advantage of this approach is that the direct connection between the key fill device 82 and the power module 85 may make the entire assembly easier to physically handle. Another advantage of this approach is having to maintain only one cable 88 instead of, for example, the two cables required for the implementation shown in FIG. 1B

Still referring to FIG. 1C, 82 is a key fill device such as the Simple Key Loader (SKL); 83 is a key fill device connector mated to 84; 84 is a power module 85 connector mated to 83; Note: 82 and 85 are directly connected with no cable; 85 is a power module according to the principles of the present disclosure, which is described in detail herein; 86 is a power module 85 connector mated to 87, where 87 is a key fill cable connector mated to 86; 88 is a cable from the power module 85 to the cryptographic computer (crypto) 91; 89 is a key fill cable connector mated to 90, where 90 is a crypto connector mated to 89; and 91 is a cryptographic computer. In one embodiment, 83 and 90 are U-328/U 6—Pin Audio Male Connectors and 89 and 87 are U-329/U—6 Pin Audio Female Connectors. In another embodiment, 84 and 86 are U-329/U—6 Pin Audio Female Connectors to mate with existing deployed hardware connectors. In yet another embodiment, 83, 84, 86 and 87 are USB or other connectors. The cable and the connector assembly are subject to government certification and the system of the present disclosure can use any connector approved by the government for key fill use.

Figure 2A:
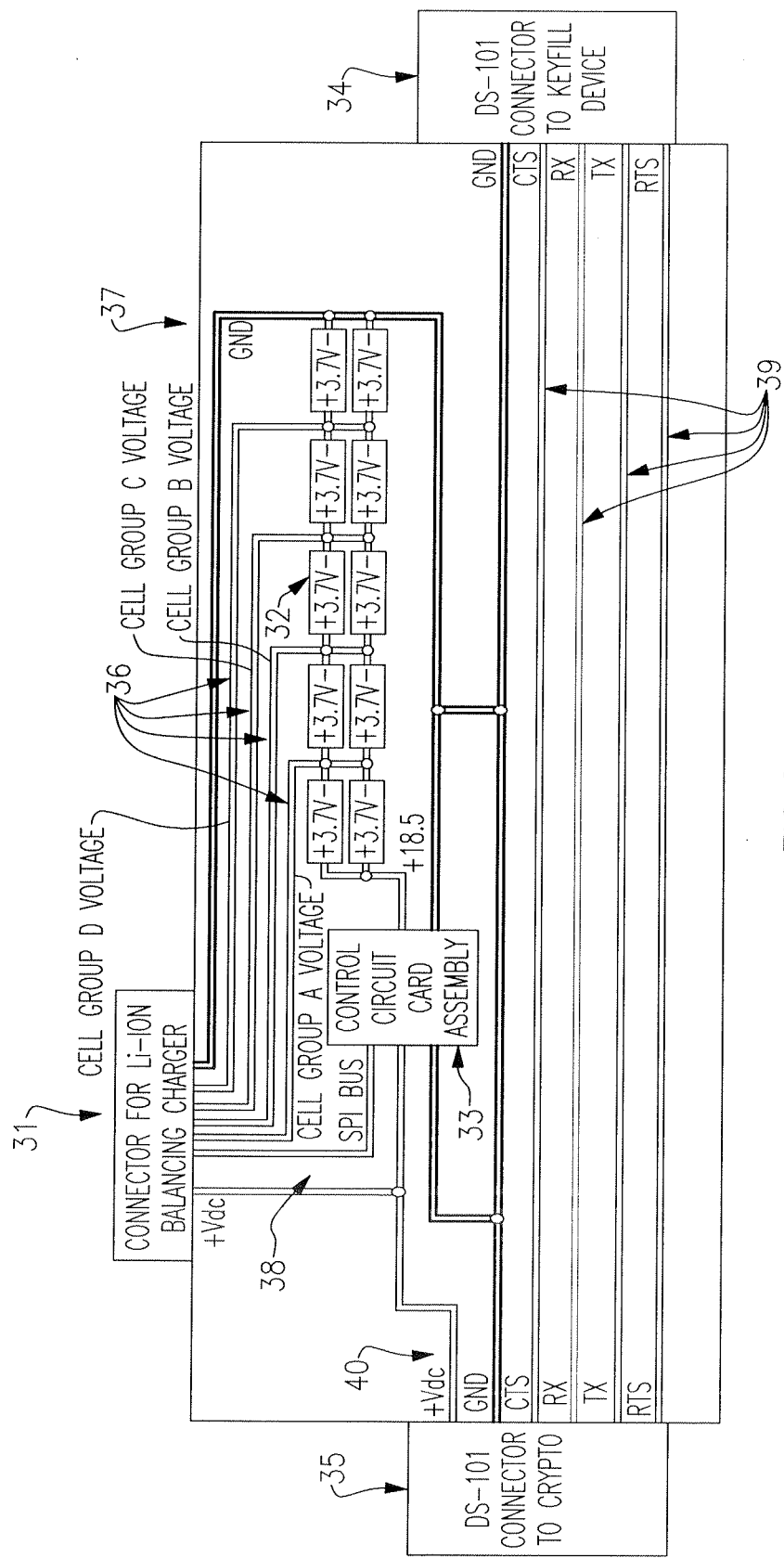
FIG. 2A is a diagrammatic view of the interior of one embodiment of a power module of a cold key load system according to the principle of the present disclosure.

Referring to FIG. 2A, a diagrammatic view of an interior of one embodiment of a power module of a cold key load system according to the principle of the present disclosure is shown. More specifically, in one embodiment an external power module comprises an 18.5 V Li-ion battery comprising ten 3.7 volt cells. In some cases, the external power module provides 6 Ampere hours of energy per charge. In one embodiment, the DS-101 protocol is used for key transfer and the device is capable of up to an 18 Vdc output with an energy storage capacity of 6 Ampere Hours (Ah).

Figure 2B:
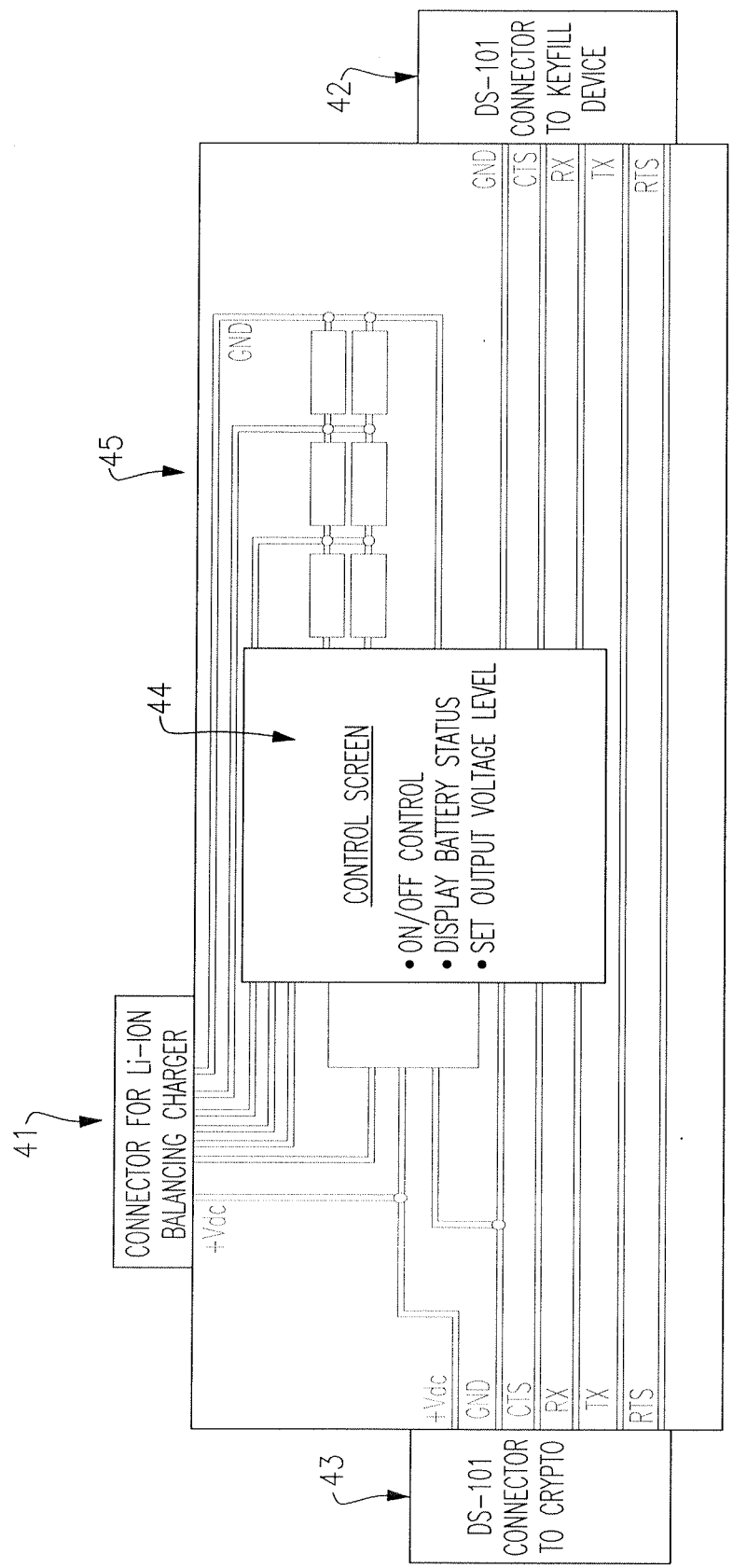
FIG. 2B is a diagrammatic view of the exterior of one embodiment of a power module of a cold key load system, as shown in FIG. 2A, according to the principle of the present disclosure.

Still referring to FIG. 2A, 31 is a connector that will interface with a Li-Ion battery charger or the like capable of performing battery cell balancing, this balancing capability is standard in modern chargers; 32 is a A 20700 size, 3.7V Li-Ion rechargeable battery cell, or the like, capable of at least a 6 Amp Hour (Ah) storage and a 30 Ampere current supply; 33 is a control Circuit Card Assembly (CCA) used to regulate voltage output to the crypto and control power module charging. In one embodiment, the CCA contains charging circuitry, a low voltage shutoff, a temperature monitor, and a user interface via a control screen, and the like. One embodiment of the control screen is shown in FIG. 2B; 34 is a power module connector for connection to a key fill device; 35 is a power module connector for connection to the cryptographic computer; 36 is cell group A, B, C, D voltages connected to a power charging connector 31. These connections are used to balance the one or more battery cells; 37 is a housing of the power module; 38 is a SPI bus for a control and status, allowing for communication between the power source charger and the control circuit card assembly; 39 are DS-101 protocol data lines used for key transfer protocol; and 40 is a user settable voltage output to power the crypto for a cold key fill operation according to the principles of the present disclosure.

Referring to FIG. 2B, a diagrammatic view of an exterior of one embodiment of a power module of a cold key load system, as shown in FIG. 2A, according to the principle of the present disclosure is shown. More specifically, 41 is a connector to interface with a Li-ion battery charger, or the like, capable of performing battery cell balancing; 42 is a power module connector for connection to a key fill device; 43 is a power module connector for connection to a cryptographic computer; 44 is a control screen that provides control and status interfaces to the user. In some cases, controls that are available comprise on/off control and setting of the output voltage level. In certain embodiments the status available comprises the charge level of the battery, the output voltage level, and the like. 45 is a housing of one embodiment of the power module of the present disclosure.

Figure 3A:
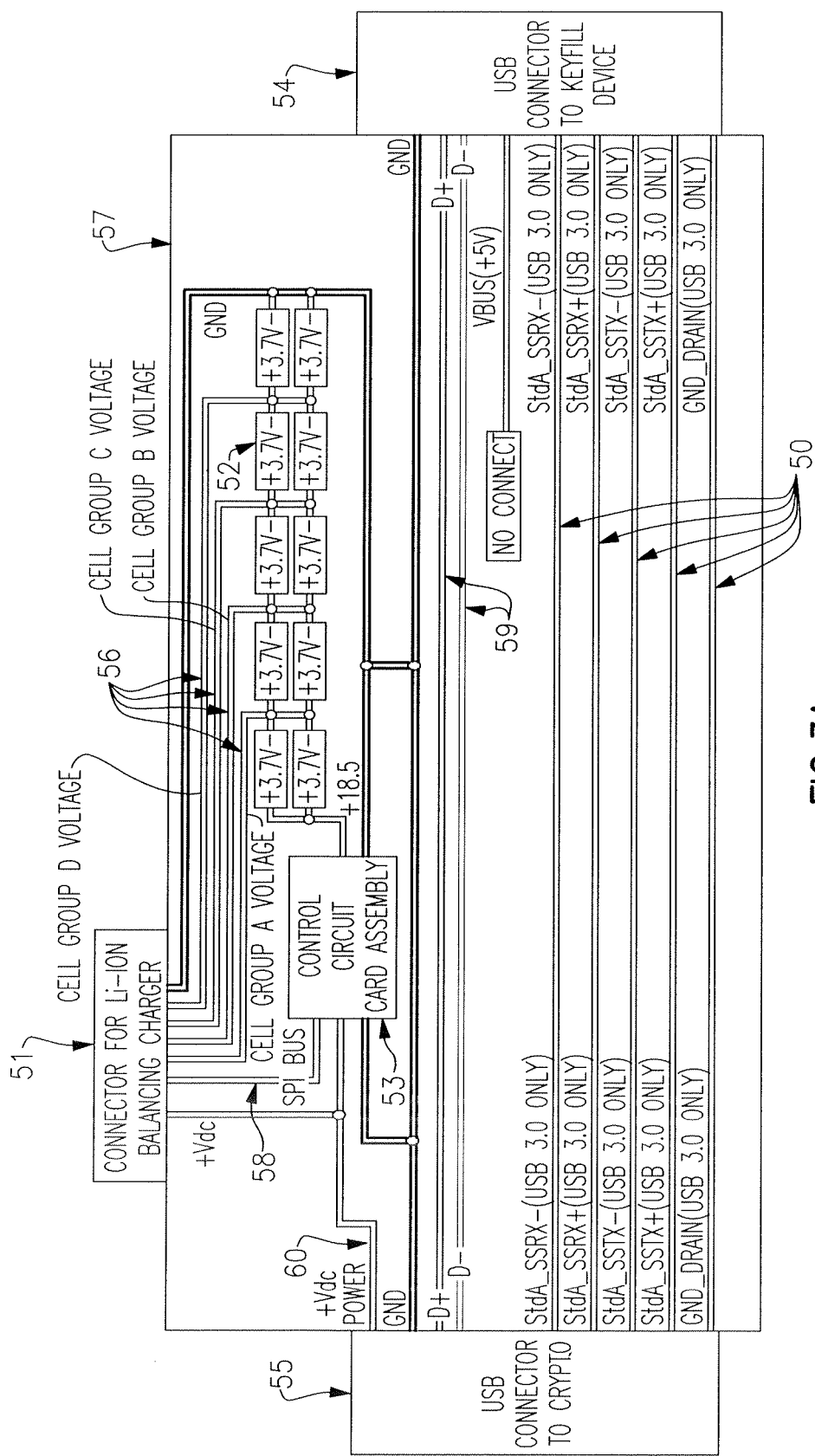
FIG. 3A is a diagrammatic view of the interior of another embodiment of a power module of a cold key load system according to the principle of the present disclosure.

Referring to FIG. 3A, a diagrammatic view of the interior of another embodiment of a power module of a cold key load system according to the principle of the present disclosure is shown. More specifically, in this embodiment, USB protocol is used for key transfer. This embodiment can support USB 1, USB 2, USB 3 protocol, and the like, for key transfer. In one embodiment, the power source is capable of up to an 18 Vdc output with an energy storage capacity of 6 Ampere Hours (Ah).

Still referring to FIG. 3A, 51 is a connector to interface with a Li-Ion battery charger, or the like, which is capable of performing battery cell balancing; 52 is a 20700 size, 3.7V Li-ion rechargeable battery cell, or the like, capable of 6 Amp Hour (Ah) storage and at least 30 Ampere current supply; 53 is a control Circuit Card Assembly (CCA) used to regulate voltage output to the crypto and to control charging. In certain embodiments, the CCA contains charging circuitry, a low voltage shutoff, a temperature monitor, and a user interface via a control screen. One embodiment of a control screen is shown in FIG. 3B. 54 is a power module connector for connection to a key fill device; 55 is a power module connector for connection to a cryptographic computer; 56 are cell group A, B, C, D voltages connected to a charging connector—these connections are used to balance the battery cells; 57 is a housing of the power module of the present disclosure; 58 is a SPI bus for a control and status, allowing for communication between the battery charger and the control circuit card assembly; 59 are USB 1 & USB 2 protocol data lines used for key transfer protocol; 50 is an optional support for USB 3 protocol, where USB 3 high speed data lines may be used for key transfer protocol; and 60 is a user settable voltage output to power the crypto for a cold key fill operation according to the principles of the present disclosure.

Figure 3B:
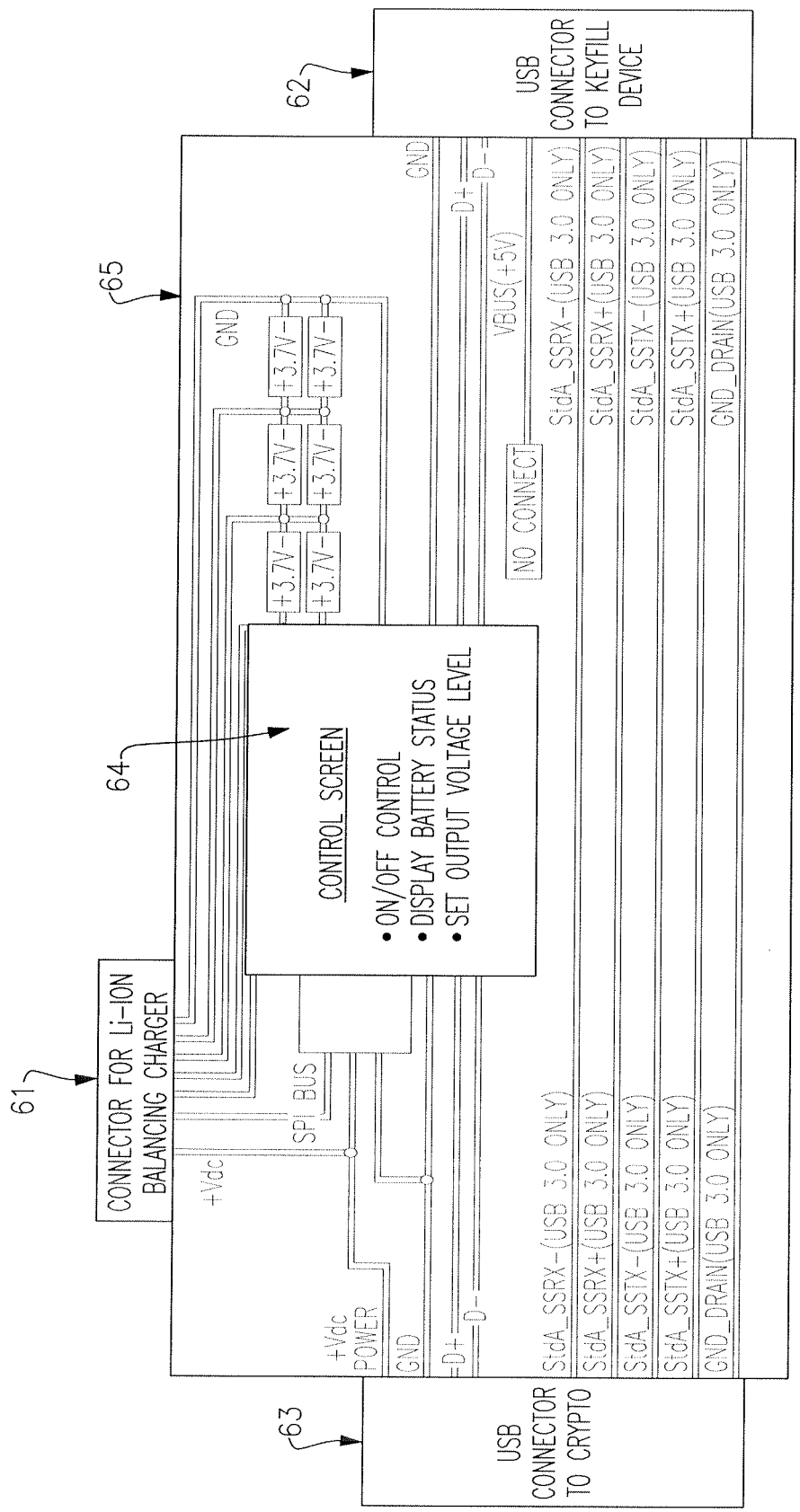
FIG. 3B is a diagrammatic view of the exterior of another embodiment of a power module of a cold key load system, as shown in FIG. 3A, according to the principle of the present disclosure.

Referring to FIG. 3B, a diagrammatic view of the exterior of another embodiment of a power module of a cold key load system, as shown in FIG. 3A, according to the principle of the present disclosure is shown. More specifically, 61 is a connector that will interface with a Li-Ion battery charger capable of performing battery cell balancing; 62 is a power module connector for connection to key fill device; 63 is a power module connector for connection to a cryptographic computer; 64 is a control screen for providing a control and a status interface to the user. In some cases, controls that are available comprise on/off control and setting the output voltage level. In certain embodiments, the status that is available comprises the charge level of the battery and the output voltage level, and the like. 65 is a housing of one embodiment of the power module of the present disclosure.

In one embodiment, the power for the cold key fill system of this disclosure comes from ten 20700 size Li-ion rechargeable battery cells. Each cell weighs approximately 2 oz and has a nominal voltage of 3.7 V. The battery cell is expected to be capable of providing a continuous discharge current of 30 A and has a nominal capacity of 3 Ampere hours. The constant maximum charge current for each battery cell is expected to be 4 A and the standard charge current is expected to be 3 A. The operating temperature for the charging and discharging the power module is about −40 C to about +85 C.

Referring to FIG. 4, a flowchart of one embodiment of a method of performing a cold key fill according to the principles of the present disclosure is shown. More specifically, a key loader is provided 100 with a variable voltage power module 102 and a connector, wherein the connector is configured to connect the key loader to the variable voltage power module and the variable voltage power module to a cryptographic computer 104. A variable output voltage is provided via the variable voltage power module 106 and multiple cold key fills are performed before requiring a recharge of the variable voltage power module 108. The voltage supplied is sufficient for booting the cryptographic computer 110 and continuing to power the cryptographic computer until the cryptographic computer fully verifies loaded keys 112, and subsequently performing a final key storage before returning the cryptographic computer to a low power state 114. In some cases, a low power state is a cryptographic computer state whereby a main cryptographic computer processor is turned off and only security monitoring circuitry is actively powered by a small coin-cell battery.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. An externally powered cold key load system, comprising:
   a key loader;
   a variable voltage power module configured to provide a variable output voltage which is sufficient to perform multiple cold key fills before requiring a recharge of the variable voltage power module; and
   a connector configured to connect the key loader to the variable voltage power module and the variable voltage power module to the cryptographic computer;
   wherein the variable voltage power module comprises a rechargeable battery pack capable of supplying 18 Vdc at 30 A and having an energy storage capacity of about 6 Ampere Hours.

2. The externally powered cold key load system according to claim 1, wherein the rechargeable battery pack weighs less than 2 lbs and the expected charge time of the battery pack is approximately 1 hour for a quick charge cycle or 3 hours for a standard charge cycle.

3. The externally powered cold key load system according to claim 1, wherein the number of cold key fills is about 90.

4. The externally powered cold key load system according to claim 1, wherein the connector uses a DS-101 protocol.

5. The externally powered cold key load system according to claim 4, wherein five of the pins have a defined purpose and the sixth pin is used for powering the cryptographic computer without disturbing any of the data pins.

6. The externally powered cold key load system according to claim 1, wherein the connector is a Y cable implementation.

7. The externally powered cold key load system according to claim 1, wherein the connector is a two cable solution.

8. The externally powered cold key load system according to claim 1, wherein the connector is a direct connect solution between the key loader and the power module.

9. The externally powered cold key load system according to claim 1, wherein the variable voltage power module is designed to run the key loader this includes any power required to boot a cryptographic computer, perform a key fill, continue to power the cryptographic computer until the cryptographic computer fully verifies loaded keys, and subsequently perform a final key storage before returning the cryptographic computer to a low power state, wherein a low power state is a cryptographic computer state whereby a main cryptographic computer processor is turned off and only security monitoring circuitry is actively powered by a small coin-cell battery and not to power the cryptographic computer multiple times.

10. The externally powered cold key load system according to claim 1, wherein the variable voltage power module provides between 5 Vdc and 18 Vdc of power.

11. A method for performing a cold key load, comprising:
    providing a key loader;
    providing a variable voltage power module;
    providing a connector, wherein the connector is configured to connect the key loader to the variable voltage power module and the variable voltage power module to a cryptographic computer;
    providing a variable output voltage via the variable voltage power module,
    performing multiple cold key fills before requiring a recharge of the variable voltage power module;
    booting the cryptographic computer;
    continuing to power the cryptographic computer until the cryptographic computer fully verifies loaded keys, and
    subsequently performing a final key storage before returning the cryptographic computer to a low power state, wherein a low power state is a cryptographic computer state whereby a main cryptographic computer processor is turned off and only security monitoring circuitry is actively powered by a small coin-cell battery.

12. The method for performing a cold key load according to claim 11, wherein the connector uses a DS-101 protocol.

13. The method for performing a cold key load according to claim 12, wherein five of the pins have a defined purpose and the sixth pin is used for powering the cryptographic computer without disturbing any of the data pins.

14. The method for performing a cold key load according to claim 11, wherein the connector is a Y cable implementation.

15. The method for performing a cold key load according to claim 11, wherein the connector is a two cable solution.

16. The method for performing a cold key load according to claim 11, wherein the connector is a direct connect solution between the key loader and the power module.

17. The method for performing a cold key load according to claim 11, wherein the variable voltage power module is designed to run the key loader and not to power the cryptographic computer multiple times.

18. The method for performing a cold key load according to claim 11, wherein the variable voltage power module provides between 5 Vdc and 18 Vdc of power.

19. An externally powered cold key load system, comprising:
    a key loader;
    a variable voltage power module configured to provide a variable output voltage between 5 Vdc and 18 Vdc of power which is sufficient to perform multiple cold key fills before requiring a recharge of the variable voltage power module, this includes any power required to boot a cryptographic computer, perform a key fill, continue to power the cryptographic computer until the cryptographic computer fully verifies loaded keys, and subsequently perform a final key storage before returning the cryptographic computer to a low power state, wherein a low power state is a cryptographic computer state whereby a main cryptographic computer processor is turned off and only security monitoring circuitry is actively powered by a small coin-cell battery; and
    a connector using a DS-101 protocol and being configured to connect the key loader to the variable voltage power module and the variable voltage power module to the cryptographic computer.

* * * * *